Jan. 20, 1925.
W. VOGEL
1,523,920
EXPOSURE TELLTALE
Filed May 16, 1921
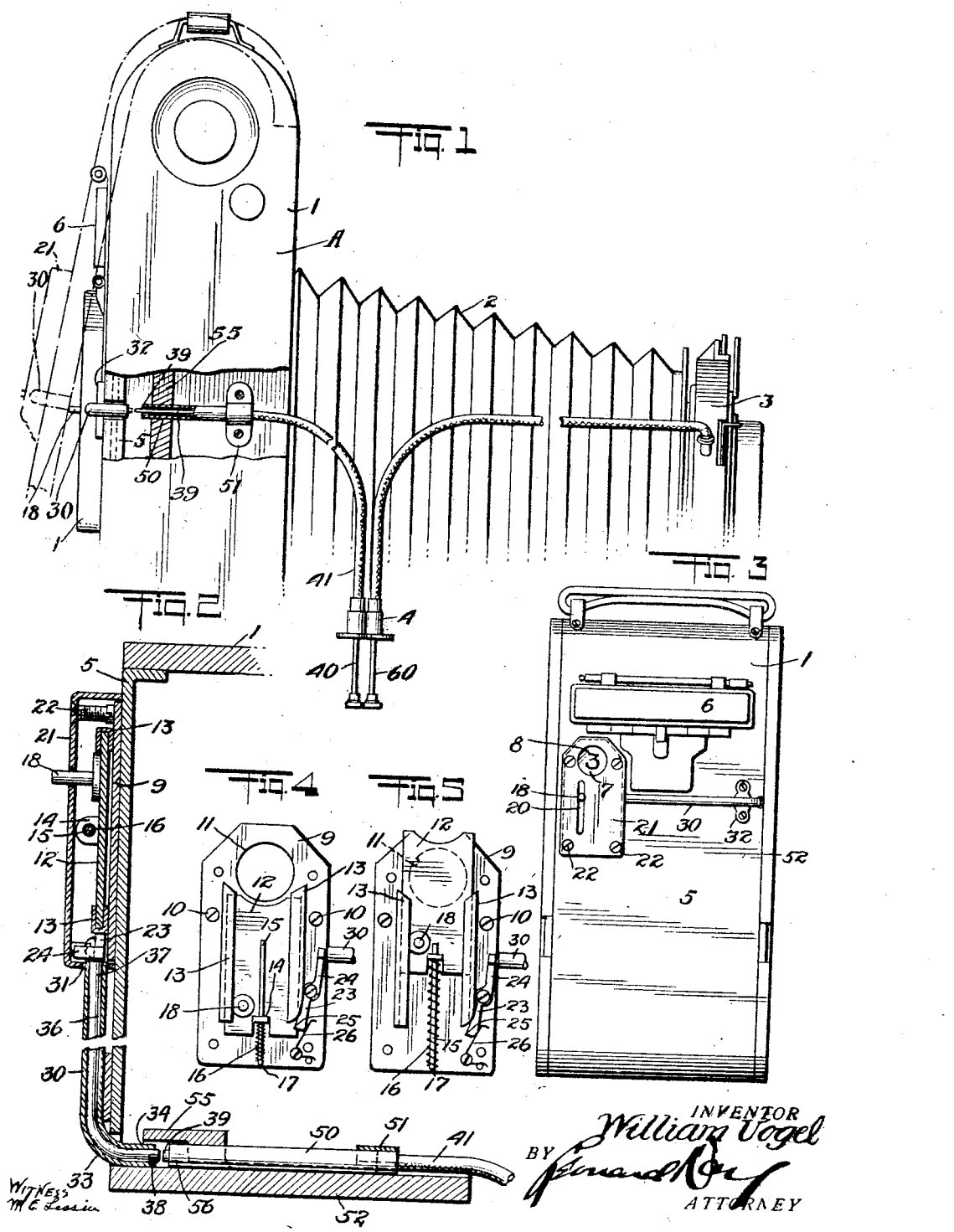

Patented Jan. 20, 1925.

1,523,920

UNITED STATES PATENT OFFICE.

WILLIAM VOGEL, OF NEW YORK, N. Y.

EXPOSURE TELLTALE.

Application filed May 16, 1921. Serial No. 470,128.

*To all whom it may concern:*

Be it known that I, WILLIAM VOGEL, a citizen of the United States, and a resident of New York, county and State of New York, have invented certain new and useful Improvements in Exposure Telltales, described and claimed in the following specification.

This invention relates to cameras of the type in which a film having sufficient length to provide a number of exposures is employed. In this type of camera there is customarily a removable back detachably securable to the camera frame to overlie the stretch of film extending between two film spools. In this removable back is provided a sight window registering with space numbers, each indicating a corresponding exposure section of the film, which numbers pass under the said window as the film is shifted to present a new surface for exposure.

After each operation of the camera shutter to make an exposure it is necessary to shift the film one shift in order that a fresh section of the film be exposed to the image from the lens, otherwise double exposures are occasioned. It has been found, in the use of a camera of this sort, that the operator often forgets, after using the camera on one occasion, whether or not he has shifted the film ready for a second exposure when a second occasion for using the camera arises. Thus he is confronted with the vexation of possibly making a double exposure, if he doesn't shift the film, or possibly wasting an unexposed section of film if he makes an unnecessary shift.

The object of the present invention is to provide a closure for the sight window through which the position number of the film is to be viewed, which closure should obscure this window when it is necessary that the film be shifted. In using a camera provided with my invention the fact that the sight window is obscured by the closure is an indication that the film must be shifted. As an important feature of my invention I propose to coordinate the obscuring of the sight window with a closure with the actuation of the lens shutter.

In accordance with my invention it is a purpose that a closure for the sight window serve as a telltale as to the fact that the film needs shifting, and I propose to arrange the closure so that it may be latched open against the action of a spring to open the sight window by a simple finger manipulation so that it will be ready for automatic closing upon the next actuation of the lens shutter.

The above will be pointed out more in detail in the following claims and will better be understood by reference to the illustrative embodiment of the invention to which the claims are directed merely for purposes of illustration and not in limitation. The illustrative embodiment of the invention is described in the following specification in connection with the accompanying drawings which form a part hereof, in which like characters designate corresponding parts in the several figures. In the drawings Fig. 1 indicates a side elevation, with parts broken away, of a camera combined with my invention;

Fig. 2 is a horizontal section illustrating the mounting of my invention;

Fig. 3 is a rear elevation drawn to a reduced scale showing the combination of parts;

Fig. 4 is a detail elevation, cover removed, of my telltale closure; and

Fig. 5 is a view similar to Fig. 4 with the closure in projected position.

The invention is applicable to any commercial camera A which illustrates an autographic folding pocket camera. These cameras comprise a frame 1, bellows 2, shutter mechanism 3, shutter actuating mechanism 4 and a removable back 5. It is customary for the back 5 of such cameras to be fitted with adjuncts such as the autograph mechanism 6 and a sight window 7 through which a shift number 8 of the film may be viewed.

In accordance with my invention I provide a guide frame 9 to be secured to the back 5 in any suitable manner as by screws or rivets 10, and having an opening 11 registering with the window 7 which may be obscured or closed by the closure 12 preferably formed as a plate sliding between lip-shaped guide-ways 13. An ear 14 is struck up from the plate 12 and is perforated to slide along the stem 15 which serves as a mounting for the compression spring 16, itself being suitably secured at its offset end 17 to the frame 9. A finger manipulatable stud 18, projecting out into easy manipulating position to the slot 20 provided in the cover plate 21 which is secured to the frame 9 in any suitable manner as by screws 22, serves to set the closure 12 against the action of the spring 16.

Forcing the closure or slide downward through the action of the stud 18 causes the catch 23 of detent lever 24 to engage the shoulder 25 formed by a notch in the edge of plate 12. A spring 26 normally presses the detent 23 into the notch to hold the plate or closure 12 clear of the window 7 against the closing action of spring 16. The rigid conduit 30 is held in position by registry with a suitable opening 31 in the side of the cover plate 21 and traverses horizontally across the camera back 5, being secured to the back at the far end in any suitable manner as by the cleat 32. At this end the conduit 30 is provided with an elbow 33 and a terminal end 34 projecting inwardly at right angles to the plane of the back 5. This conduit 30 houses a flexible push rod 36 of the type usually employed in a shutter actuator. One end 37 of this rod engages one end of the detent lever 24 and the other end 38 is in position to serve as a thrust coupling for the end 39 of a continuing thrust rod operated by the push button 40 through the flexible conduit 41. The push button 40 is preferably combined as a twin with the push button of the shutter 3, although it is to be understood that the flexible push rod 39 may be a branch of the push rod actuating the shutter 3. In order that the end of the push rod 39 may form an automatically connecting joint with the end 38, it is preferred that the flexible conduit 41 be extended into a short section 50 of rigid conduit secured by the cleat 51 to the inner face of the side wall 52 of frame 1. The rigid conduit 50 likewise preferably passes through a suitable perforation in the frame-piece 55 so that its end 56 is rigidly held in juxtaposition to be abutted by the end 34 so that the ends 34 and 56 together form an automatic joint between the removable cover 5 and the frame 1 for the actuating mechanism of closure 12 when the cover 5 is snapped in place. This juxtaposition is shown particularly well in Figs. 1 and 2, while the dot-dash lines in Fig. 1 show the relative position of the cover as it is being removed.

An actuation of the shutter-actuating mechanism 4 through the medium of its push button 60 necessitates a contemporaneous actuation of the thrust rod 39. The thrust of the rod 39 is imparted to the rod 36, the end 37 operating the detent lever 24 which removes the detent 23 from shoulder 25, allowing the spring 16 to thrust the closure 12 over the window 7. This constitutes a tell-tale indicating that the film must be shifted before another exposure is made. In order to inspect the film it is of course necessary to remove the closure 12, at which time the necessary shift for the film should be made. The push rod actuator mechanism 40 and 60 are shown merely for purpose of illustration and not limitation.

What I claim and desire to secure by United States Letters Patent is:—

1. In combination a roll-film camera having a removable wall which wall is provided with a sight window for viewing the exposure numbers of a film and which has an openable and closable front portion to permit of focusing; a closure for said window movably mounted on said removable wall to move from a window-covering to a window-clearing position and vice versa; means co-ordinated with the shutter actuating mechanism of said camera to cause said closure to move into said window-covering position upon an operation of said shutter, said means comprising a force transmitting means having an automatic joint between said removable wall and the body of said camera whereby the removability of said wall is preserved and all of said means beyond said automatic joint being contained within said body when the camera is closed.

2. A camera comprising a body-frame; an openable back for said body-frame having a sight-window for viewing an exposure number; a lens-shutter; a closure plate for said sight window movable between open and closed position relatively to said sight window; a spring pressing said closure towards a tell-tale position; detent mechanism for holding said closure against the urge of said spring; a pressure-operated thrust-piece for releasing said detent-mechanism and carried by said back; compression actuating means for actuating said lens-shutter and said detent-mechanism comprising a conduit leading from said frame to said thrust-piece on said back and having an automatically operating self-registering joint between the parts of said conduit respectively on said frame and said back to permit the removal of said back.

In witness whereof I have signed my name to this specification, at New York, N. Y., this 14th day of May, 1921.

WILLIAM VOGEL.